(12) United States Patent
Kaipa et al.

(10) Patent No.: US 7,194,485 B2
(45) Date of Patent: Mar. 20, 2007

(54) MAPPING XML SCHEMA COMPONENTS TO QUALIFIED JAVA COMPONENTS

(75) Inventors: Sam P. Kaipa, San Francisco, CA (US); Ashish Rahurkar, Belmont, CA (US); Pradeep C. Bollineni, Sunnyvale, CA (US); Ashutosh Arora, Burlingame, CA (US)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 10/718,722

(22) Filed: Nov. 21, 2003

(65) Prior Publication Data

US 2005/0114394 A1   May 26, 2005

(51) Int. Cl.
*G06F 17/30* (2006.01)
(52) U.S. Cl. .................................. 707/104.1
(58) Field of Classification Search ............ 707/1, 707/2, 9, 10, 100; 715/513; 709/101
See application file for complete search history.

(56) References Cited

U.S. PATENT DOCUMENTS

| | | | |
|---|---|---|---|
| 6,347,307 B1 | 2/2002 | Sandhu et al. | |
| 6,480,865 B1 | 11/2002 | Lee et al. | |
| 6,569,207 B1 * | 5/2003 | Sundaresan | 715/513 |
| 2001/0029604 A1 | 10/2001 | Dreyband et al. | |
| 2001/0047385 A1 | 11/2001 | Tuatini | |
| 2002/0010781 A1 | 1/2002 | Tuatini | |
| 2002/0026471 A1 * | 2/2002 | Bent et al. | 709/101 |
| 2002/0032783 A1 | 3/2002 | Tuatini | |
| 2002/0035645 A1 | 3/2002 | Tuatini | |
| 2002/0073091 A1 * | 6/2002 | Jain et al. | 707/100 |
| 2002/0128734 A1 | 9/2002 | Dorsett, Jr. | |
| 2003/0070158 A1 | 4/2003 | Lucas et al. | |
| 2003/0110177 A1 | 6/2003 | Andrei et al. | |

FOREIGN PATENT DOCUMENTS

| | | |
|---|---|---|
| WO | WO2002101579 | 12/2002 |
| WO | WO2003050712 | 6/2003 |

\* cited by examiner

*Primary Examiner*—Etienne P LeRoux
(74) *Attorney, Agent, or Firm*—Michael J. Buchenhorner; Prentiss W. Johnson

(57) ABSTRACT

The present invention provides a method, apparatus, and computer instructions for mapping and labeling XML schema elements and types. In an exemplary embodiment, each XML schema element and type is uniquely labeled, using distinguishing parameters such as namespace to create name parts like a Hashing code and suffixes in order to achieve unique mapping. The parameters selected are predetermined in order to achieve naming that remains distinct across successive consumptions of a schema. The selection disclosed accomplishes unique labeling, while also permitting one to still adhere to the strict naming standards of the target language (e.g., Java). As a result, schema components belonging to multiple namespaces can be mapped to Java components belonging to a single package.

20 Claims, 5 Drawing Sheets

FIG. 5 (Sample Mapping Table)

| XML Schema Components | Java Components |
|---|---|
| Elements (local and global) | Member variables |
| Attributes (local and global) | Member variables |
| Attribute Groups (global) | Member variables |
| Groups (global) | Classes |
| Simple Types (named and anonymous) | Classes |
| Complex Types (named and anonymous) | Classes |

FIG. 6 (Sample Naming Table)

| Schema Component Name | Schema Component Type | Java Component Name | Java Component Type | Member Variable Type |
|---|---|---|---|---|
| 1) Product | Named Complex Type | XML_N101 46403 10_Product | Class | |
| 2) ID | Local Element | ID | Member variable | String |
| 3) Name | Local Element | Name | Member variable | String |
| 4) ID | Local Element | ID_N1950439913 | Member variable | String |
| 5) Data | Local Element | Data | Member variable | XML_P0249301427_Data |
| 6) ID | Local Element | ID_N1950439913_0 | Member variable | String |
| 7) ID | Attribute | ID_N1950550919 | Member variable | String |
| 8) Anonymous Complex Type Referred by Data | Anonymous Complex Type | XML_P0249301427_Data | Class | |
| 9) Desc | Local Element | Desc | Member variable | String |
| 10) MfgDate | Local Element | MfgDate | Member variable | String |
| 11) LongNames_abcdefghijklmnopqrstuvwxyz_abcdefghijklmriopqrstuvwxyz | Named Complex Type | XML_N 16408747 45_LongNames_abcdefghijklmnopqrstuvwxyz_abcde | Class | |
| 12) LongElemName_abcdefghijklmnopqrstuvwxyz_abcdefghijklmnopqrstuvwxyz_abcdefghijklmnopqrstuvwxyz_abcdefghijklmnopqrstuvwxyz | Local Element | LongElemName_abcdefghijklmnopqrstuvwxyz_abcdefghijklmnopqrstuvwxyz_abcdefghijklm | Member variable | String |

MAPPING XML SCHEMA COMPONENTS TO QUALIFIED JAVA COMPONENTS

TECHNICAL FIELD

The invention disclosed generally relates to computers and computer software. More specifically, the invention is generally related to program language mapping and conversion tools.

BACKGROUND OF THE INVENTION

One of the major challenges in computer operations is how to make different systems exchange information in an efficient and cost-effective manner. A key aspect to this challenge is the need for a means to enable applications using different languages to exchange information. In the past, when systems were more isolated, this challenge could be met with more static solutions. These were labor intensive, frequently requiring extensive manual effort in mapping the languages, formats and attributes of different database and network systems to each other. If changes were made to one or more of the databases or networking platforms (something unavoidable for most businesses), then further changes were required in the integration code. In addition to the time and expense required by these approaches, they were also prone to manual errors and loss of features due to the inevitable comprises forced by the complexities of integration.

As the demand for information sharing has grown, so has the need for more automated solutions to the exchange of information between systems. The development of a feature rich and robust language like XML (Extensible Markup Language) is facilitating the cross-platform and application exchange of information much more than its predecessor HTML (Hyper Text Markup Language) or proprietary languages did. However, the efforts to date at automating the mapping of information between XML and object-oriented languages like Java remain constrained by the inherent differences in their component models. Following past approaches, the attempts so far have focused on a simple one to one component mapping.

While these approaches may be adequate in simpler configurations like those involving a single namespace, they create a range of potentially unworkable problems in more complex systems. For example, mapping the more robust XML schemas to other object (e.g., Java) classes can lead to component name collisions. (XML schemas define shared markup vocabularies, the structure of XML documents which use those vocabularies, and provide hooks to associate semantics with them.) Further, component naming restrictions for schemas differ from those imposed by the Java standard. Thus, schema constructs may not have explicit naming mechanisms that would allow for simple mapping to Java component names, and complex information regarding the schema is needed to generate Java component names for such schema constructs. Moreover, parts of schemas change over time, requiring regeneration of the Java components from schema components. Across these multiple schema to Java component conversions, the unchanged schema components should ideally map to the previously designated Java component names. If not, significant impacts on the system as a whole may occur when the Java component names are changed, including the need to rework of other components dependent on the Java components.

In considering these problems, we have identified a number of issues associated with the consumption and transformation of XML schemas into other proprietary and object structures like Java classes. Several of the key challenges identified include:

1) Uniquely identifying XML elements and types within the set of all unique legal XML schemas;

2) Uniquely naming XML elements and types, so that the names adhere to Java naming standards (found, e.g., in the Java language specification) for packages, classes, methods and variables, even through successive consumption efforts on modified XML schemas; and 3) Mapping XML elements and types to reusable proprietary definitions for modular processing.

While other applications have the ability to consume XML schemas to create Java classes, they have not addressed how to handle more complex conversions involving these issues of code regeneration, unique name handling, adherence to naming standards, and multiple schema namespaces. Thus, there is a need for a better way to carry out the conversion of XML schema to Java and other object definitions.

SUMMARY

The present invention provides a method, apparatus, and computer instructions for mapping and labeling XML schema elements and types. In an exemplary embodiment, each XML schema element and type is uniquely labeled, using distinguishing parameters such as namespace to create name parts like a Hashing code and suffixes in order to achieve unique mapping. The parameters selected are predetermined in order to achieve naming that remains distinct across successive consumptions of a schema. The selection disclosed accomplishes unique labeling, while also permitting one to still adhere to the strict naming standards of the target language (e.g., Java). As a result, schema components belonging to multiple namespaces can be mapped to Java components belonging to a single package.

BRIEF DESCRIPTION OF THE DRAWINGS

While the invention is defined by the appended claims, as an aid to understanding it, together with certain of its objectives and advantages, the following detailed description and drawings are provided of an illustrative, presently preferred embodiment thereof, of which:

FIG. 5 is a table illustrating mapping of XML schema components to Java components in accordance with the first embodiment of the invention.

FIG. 6 is a table illustrating Java component naming generated from an exemplary XML schema snippet in accordance with the first embodiment of the invention.

DESCRIPTION OF THE PREFERRED EMBODIMENT

In a preferred embodiment of the invention, a conversion engine is provided that includes an algorithm for operating on one or more sets of XML schemas to generate proprietary data definitions that uniquely model the XML schemas. In addition to the sense given by the XML Schema recommendations of the W3C Consortium to "unique," by "unique mapping" we mean that (a) each XML schema element or type is mapped to a component of the conversion language (i.e., object language into which XML documents will be converted based on the mapping definition), and (b) each XML schema element or type is uniquely identified within the set of all unique (preferably legal) XML schema. By "unique naming," we mean that unique XML schema element or type (a) generate unique component names in the conversion language (e.g., Java) that substantially (preferably fully) adhere to the conversion language naming standards, and (b) generate the same unique name across multiple schema conversions. The resulting definitions for each schema are objects, and in the case of the commonly preferred conversion language, Java, are essentially Java objects. As such, each definition generated should adhere to the Java naming standards. The mapped components should also remain distinct across multiple consumptions or transformations of the XML schemas.

This embodiment may be advantageously implemented as part of complex systems like business integration (BI) systems. One example of a BI system is WebSphere Business Integration Servers and programs, available from International Business Machines (IBM). A convenient way to implement this preferred embodiment is to include it as part of an automated object discovery agent, a tool for both performing automated object discovery and generating business object definitions.

An object discovery agent according to this preferred embodiment consumes each XML schema and creates business object definitions (e.g., Java objects). These objects can be used as containers for XML instances that adhere to the XML schema. In doing so, the schema conversion algorithm preferably satisfies each of challenges identified above, i.e., code regeneration, unique name handling, adherence to naming standards, and multiple schema namespaces.

When converting XML schemas to Java components, one preferred methodology includes the following function goals:

1) Adhere to the character limitations as defined by the Java standard for various Java components (e.g., While XML schema element names can contain a period character ('.'), mapped Java variable names cannot).

2) Adhere to common application restrictions with respect to component naming.

3) Uniquely and distinctly map all schema components to Java components with respect to name.

4) Distinctly name Java components so that successive conversions of XML schema to Java yield the same named Java components.

5) Provide user customizability for further Java component name distinctions.

Figure 1:
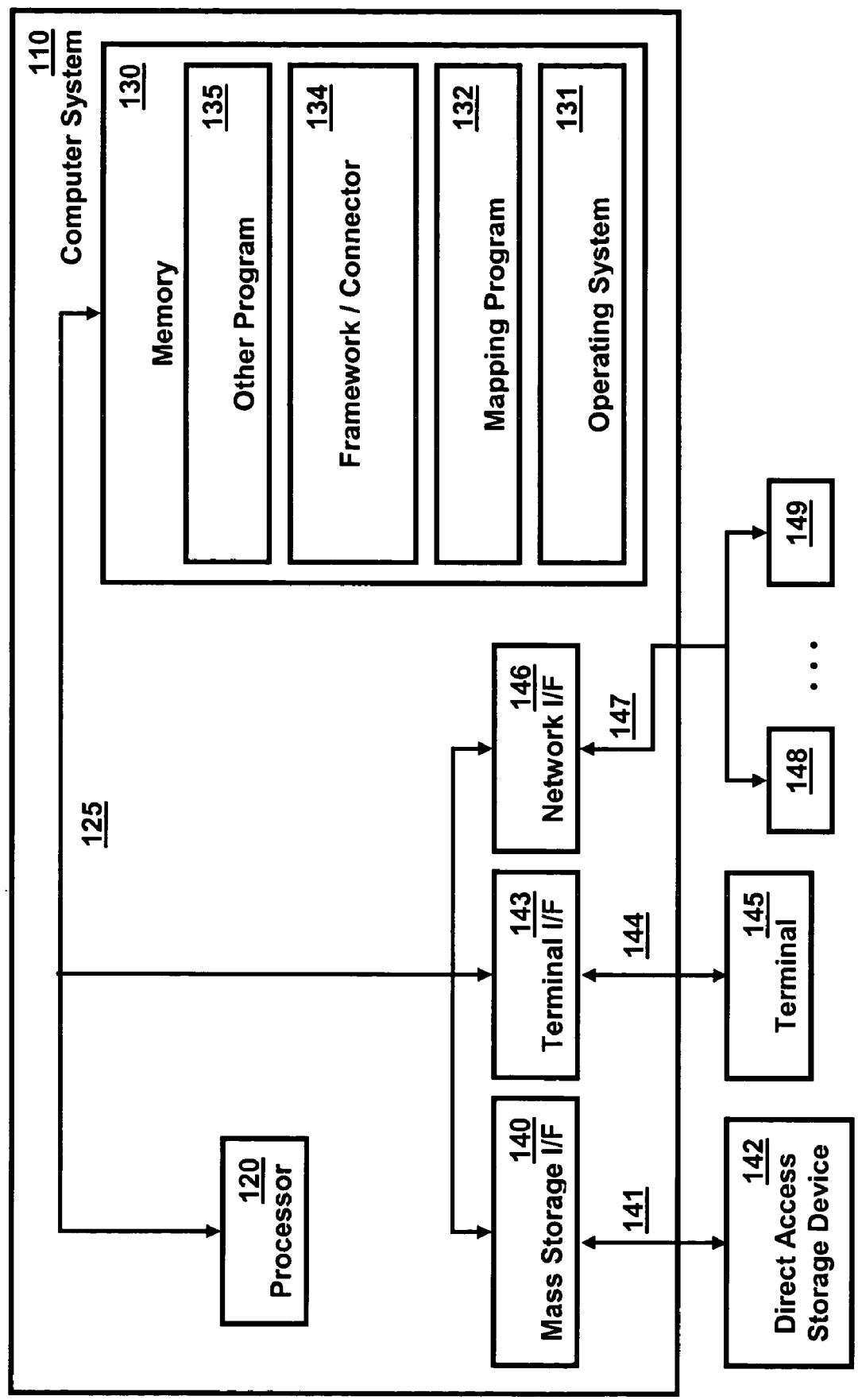
FIG. 1 is a block diagram of an information system consistent with the invention.

With reference now to the drawings and in particular FIG. 1, a pictorial representation of an information processing system in which the present invention may be implemented is depicted in accordance with certain presently preferred embodiments of the invention. In general, the routines which are executed when implementing these embodiments, whether implemented as part of an operating system or a specific application, component, program, object, module or sequence of instructions, will be referred to herein as computer programs, or simply programs. The computer programs typically comprise one or more instructions that are resident at various times in various memory and storage devices in an information processing or handling system such as a computer, and that, when read and executed by one or more processors, cause that system to perform the steps necessary to execute steps or elements embodying the various aspects of the invention.

A particular information handling or processing system for implementing the present embodiments is described with reference to FIG. 1. However, those skilled in the art will appreciate that embodiments may be practiced with any variety of computer system configurations including handheld devices, multiprocessor systems, microprocessor-based or programmable consumer electronics, minicomputers, mainframe computers and the like. The embodiment may also be practiced in distributed computing environments where tasks are performed by remote processing devices that are linked through a communications network. In a distributed computing environment, program modules may be located in both local and remote memory storage devices.

In addition, various programs and devices described here may be identified based upon the application for which they are implemented in a specific embodiment of the invention. However, it should be appreciated that any particular program or device nomenclature that follows is used merely for convenience, and the invention is not limited to use solely in any specific application identified and/or implied by such nomenclature.

Referring now to FIG. 1, a computer system 110 consistent with the invention is shown. For purposes of the invention, computer system 110 may represent any type of computer, information processing system or other programmable electronic device, including a client computer, a server computer, a portable computer, an embedded controller, a personal digital assistant, etc. The computer system 110 may be a standalone device or networked into a larger system. In one embodiment, the computer system 110 is an eServer iSeries OS/400 computer available from International Business Machines of Armonk, N.Y.

The computer system 110 could include a number of operators and peripheral systems as shown, for example, by a mass storage interface 140 operably connected to a direct access storage device 142 via high speed bus interface 141, by a video interface 143 operably connected to a display 145, and by a network interface 146 operably connected to a plurality of networked devices 148 . . . 149. The display 145 may be any video output device for outputting a user interface. The networked devices 148-149 could be desktop or PC-based computers, workstations, network terminals, or other networked information handling systems, connected by any one of a variety of networking systems including a local area network (LAN) 147, personal area network (PAN), or wide area network (WAN).

Computer system 110 is shown with a system environment that includes at least one processor 120, which obtains instructions or operation codes (also known as opcodes) and data via a bus 115 from a main memory 130. The processor 120 could be any processor adapted to support the debugging methods, apparatus and article of manufacture of the invention. In particular, the computer processor 120 is selected to support monitoring of memory accesses according to user-issued commands. Illustratively, the processor is a PowerPC available from International Business Machines of Armonk, N.Y.

The main memory 130 could be one or a combination of memory devices, including random access memory, non-volatile or backup memory (e.g., programmable or flash memories, read-only memories, etc.). In addition, memory 130 may be considered to include memory physically located elsewhere in a computer system 110, for example, any storage capacity used as virtual memory or stored on a mass storage device or on another computer coupled to the computer system 110 via bus 115.

The main memory 130 includes an operating system 131, a conversion program 132, a framework/connector module 134, and other programs 135. These other programs 135 could include a programming analysis and transformation tool. The conversion and connector programs are generally of the type of adapters or tools used to facilitate information exchanges between differing applications, such as enterprise applications using XML documents and web applications using Java objects. These are generally implemented in software, but can be implemented in a combination of hardware (firmware) and software. In an alternate embodiment, the adapter tool could include other mapping or override features, configured to interface with other programs or a user via a GUI (graphical user interface) at terminal 145. Although illustrated as integral programs, one or more of the foregoing may exist separately in the computer system 110, and may include additional components not described. Processor 120 implements the processes illustrated using computer implemented instructions, which may be located in a memory such as, for example, main memory 130, memory 142, or in one or more peripheral devices 148–149.

Figure 2:
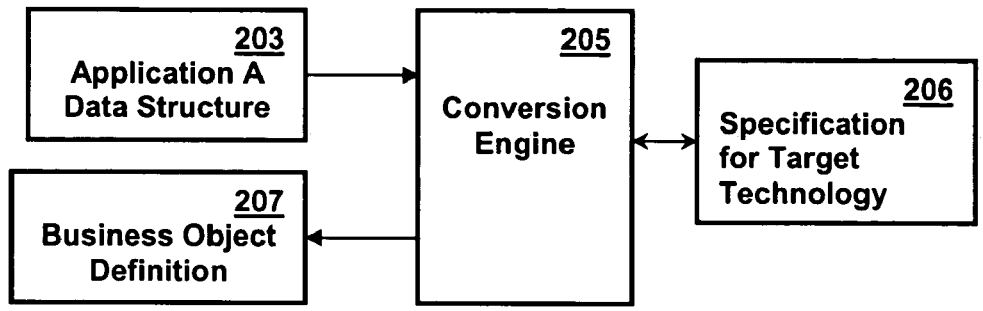
FIG. 2 is a block diagram illustrating a software program for generating a business object definition from an XML schema in accordance with a first embodiment of the invention.

Turning now to FIG. 2, the major elements of a preferred component for converting XML schemas to XML—Java object definitions are illustrated. These program elements include a conversion engine 205, an automated mapping and naming program. This program includes a mapping element, for uniquely mapping XML schema components to Java components, and a naming element, for applying a methodology that uniquely names each Java component. Specification 206 provides the rules used for mapping and naming for a given target technology, the one highlighted below being XML. However, one skilled in the art will readily appreciate how to apply these teachings to future successor or substitute languages (including those substantially similar in major functionality) to XML. In such a case, multiple specifications may also be loaded, although a single specification would likely be used in a typical adapter, operating to generate object definitions for converting between a target technology like XML and a single conversion language like Java.

The conversion engine 205 also receives as input the data structure of the conversion language. As Java is increasingly used in many business applications, it may well be the preferred application data structure 203 for discovery and use by many conversion engines 205. In the illustrated embodiment of an integration system, the typical output of conversion engine 205 will be a business object definition for use in converting XML and Java objects exchanged via the integration system.

Figure 3:
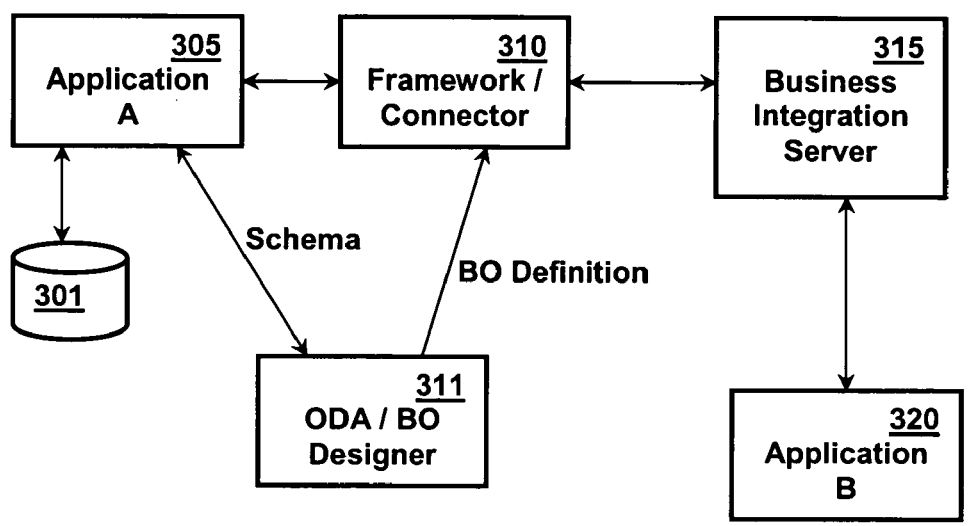
FIG. 3 is a block diagram illustrating an application program environment for the first embodiment.

FIG. 3 is a block diagram illustrating one such integration system architecture. In this case, the conversion engine 205 is part of an automated object discovery agent (ODA) 311 that functions to provide a business object definition to a runtime framework/connector component or adapter 310. The connector may be an application specific component, functioning to provide bi-directional connectivity to the application API or technology interface. The framework can function to provide a common runtime platform for implementing specific connectors, to provide broker interaction, logging and QoS services, and to assure uniform behavior and administration across a set of adapters. The ODA receives (e.g., discovers by an automated agent) XML schemas from a target application 305, which in the illustrated case is a DBMS (data base management system) retrieving and storing records from data store 301 and exchanging information via connector 310. A business integration server 315 provides process integration services for the various enterprise applications and adapters, including different applications as illustrated by application 320.

Figure 4:
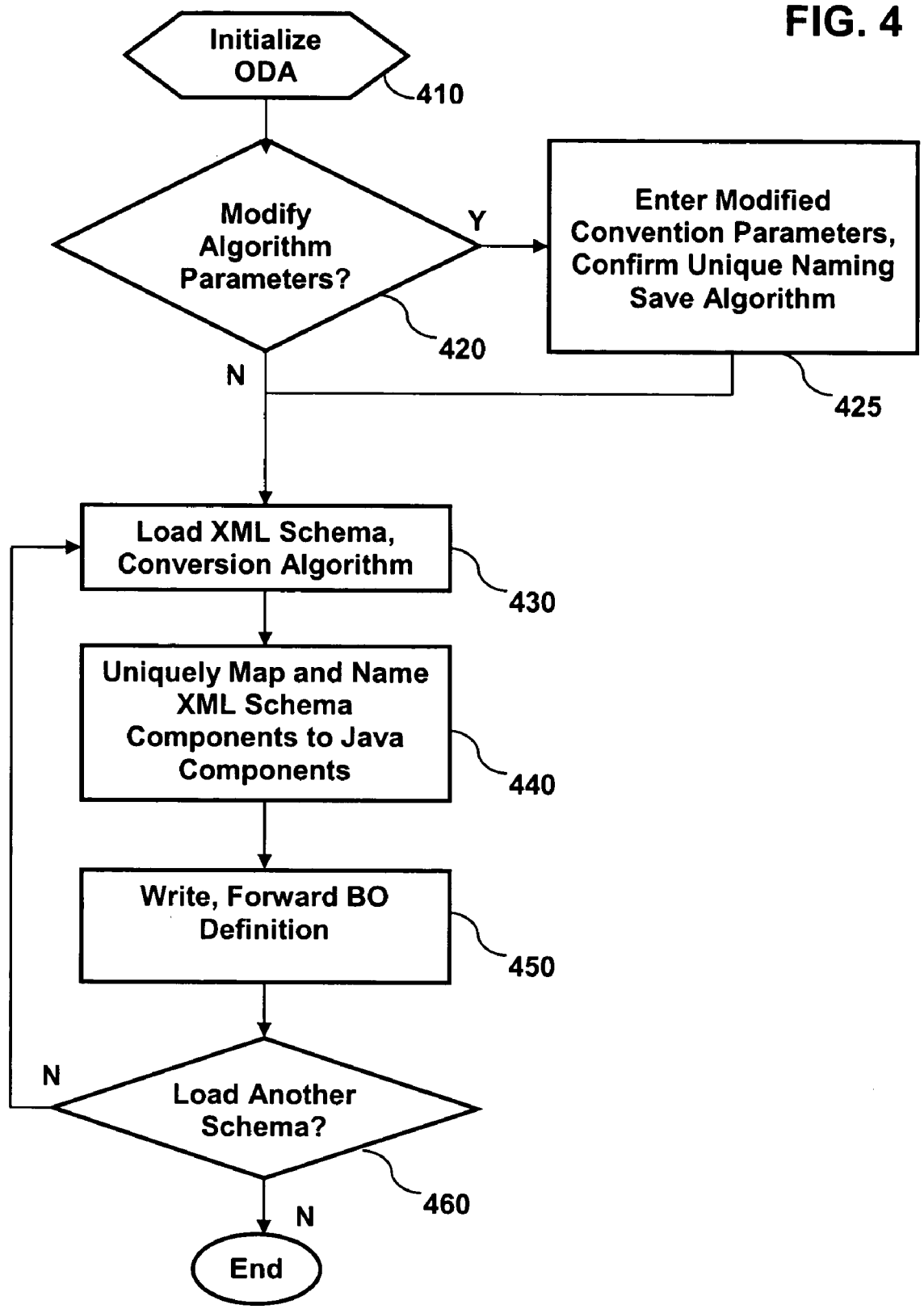
FIG. 4 is a flow chart of an illustrative conversion operation according to the first embodiment of the invention.

The operation of the preferred embodiment may be understood by reference to FIGS. 4 through 6. When a schema is first consumed, or when its modification requires a further conversion, ODA 311 is called up to perform the necessary business object definition generation (step 410). This can be done in response to manual (user) input, or alternatively by an automated call in response to schema changes in Application A. In typical operation, the next step will be to load the new or modified schema, and apply the conversion algorithm (step 430). However, a user may also, optionally, be prompted to load new technology specifications or otherwise change the parameters used by the ODA/conversion engine (steps 420, 425). This includes the ability to define alternative component mapping and naming conventions, as well as to confirm that uniqueness requirements are satisfied by changes in the specification.

Once loaded, the ODA/conversion engine 311 proceeds to apply the mapping and naming criteria, and generate a business object definition (step 440). FIG. 5 is a table illustrating a preferred mapping between XML schema components and Java components. FIG. 6 is a table illustrating an exemplary naming convention for an XML schema to Java component conversion. The resultant business object definition (in this case, preferably a Java object) is forwarded to the connector 310 for use in runtime object conversion. If another schema is ready to be operated on, the process is repeated (steps 450, 460).

When naming Java components, the following steps are preferably taken:

1) Users have the option of specifying a string (to group the generated components) that will be added as a prefix to the set of generated Java component names.

2) For all schema components names, all Java unsupported characters are replaced within the name with an underscore character '_' to generate the Java component name.

3) If the generated names exceed common application character length limitations, a hash code is generated based on the original schema component QName, the generated name is truncated and the hash code appended so that the length adheres to the character length limitations. A preferred form of hashing is generating an eleven character code based on any convenient hashing function, with ten characters used as the hash code itself and the first character representing a positive or negative (e.g., P or N). If the hash function returns integer values less than ten characters in length, the integer is padded (e.g., with leading zeroes).

The following is an exemplary naming convention for use in connection with the specified XML components:

1) Elements (local and global): Map element names to member variable names. If two elements or an element and an attribute have the same name within a type definition in the schema, unique member variable names must be generated in the class definition corresponding to the schema type. By the Java naming standard, member variables in a class must be uniquely named. The following two step process uniquely names the member variables: (a) Generate a hash code based on the QName of the element and the string "Elem"; generate the member variable name using the element name suffixed with the hash code; (b) if name collisions exist after step 1, append a sequence number to the name generated in step a.

2) Simple Types (named and anonymous): Map simple types to primitive Java types.

3) Complex Types (named and anonymous): (a) Named complex types—Map complex type names to Java class names. Generate a hash code based on the QName of the complex type. The Java class name will be the complex type name suffixed with the generated hash code. (b) Anonymous complex types—Create a string comprised of the concatenation of all the names of the components in the hierarchy for this anonymous complex type starting from the schema element including the target namespace of the schema if present. Generate a hash code using the string above. The name is generated by appending the hash code to the name of the immediate parent component of the anonymous complex type.

4) Attributes (local and global): Map attribute names to member variable names. If two attributes or an attribute and element have the same name within a type definition in the schema, unique member variable names must be generated in the class definition corresponding to the schema type. By the Java standard, member variables in a class must be uniquely named. The following two step process uniquely names the member variables: (a) Generate a hash code based on the QName of the attribute and the string "Attr"; generate the member variable name using the attribute name suffixed with the hash code; (b) if name collisions exist after step 1, append a sequence number to the name generated in step a.

5) Groups (global): Same as named complex types.

6) Attribute Groups (global): Same as attributes.

This may be further illustrated by consideration of the following XML schema snippet (Table 1), in connection with the table of FIG. 6:

TABLE I

Example: XML Schema Snippet

```
<xsd:schema targetNamespace="typesNS" xmlns="typesNS'
xmlns:xsd=http://www.w3.org/2001/XMLSchema>
    <xsd:complexType name="Product">
        <xsd:sequence>
            <xsd:element name="ID" type="xsd:string"/>
            <xsd:element name="Name" type="xsd:string"/>
            <xsd:element name="ID" type="xsd:string"/>
            <xsd:element name="ProductType" type="xsd:string"/>
            <xsd:element name="Data">
                <xsd:complexType>
                    <xsd:sequence>
                        <xsd:element name= "Desc"
                            type="xsd:string"/>
                        <xsd:element name="MfgDate"
                            type="xsd:date"/>
                    </xsd:sequence>
                </xsd:complexType>
            </xsd:element>
        </xsd:sequence>
        <xsd:attribute name="ID" type="xsd:int" />
    </xsd:complexType>
</xsd:complexType
name="LongNames_abcdefghijklmnopqrstuvwxyz_
abcdefghijklmnopqrstuvwxyz">
    <xsd:sequence>
        <xsd:element
name="LongElemName_abcdefghijklmnopqrstuvwxyz_
abcdefghijklmnopqrstuvwxyz_
```

TABLE I-continued

Example: XML Schema Snippet

```
abcdefghijklmnopqrstuvwxyz_abcdefghijklmnopqrstuvwxyz"
type="xsd:string"/>
        </xsd:sequence>
    </xsd:complexType>
</xsd:schema>
```

When the conventions described above are applied to the snippet of Table 1, the illustrative Java component names of FIG. 6 are generated (with the user defined prefix being "XML"). The methodology by which Java component names of FIG. 6 were preferably generated may be further understood in the following (where the numbers in the square brackets correspond to the row numbers in FIG. 6):

1) Complex Type names to Java class names: Apply the hash code of the QName (typesNS#Product) of the complex type. This guarantees uniqueness of the Java class names generated in the system [1].

2) Elements with same name and type: Take the hash code of the element name followed by "Elem" (ID#Elem). If there are more than one such element, add a suffix (0,1 etc.) in increments of 1 [2, 4, 6].

3) Elements and Attributes with same name: For elements follow the process in step 2. For attributes take the hash code of the attribute name followed by "Attr" (ID#Attr) [6, 7].

4) Anonymous Complex Types to Java class names: Create a string comprised of the concatenation of all of the names of the components in the hierarchy for the anonymous complex type starting from the schema element including the target namespace of the schema. Generate a hash code using the concatenated string. The name is generated by appending the hash code to the name of the immediate parent component of the anonymous complex type. "Data"'s type is anonymous. Its hash code is generated using typesNS:Product#Data which is the path from the global type definition (Product). This will guarantee uniqueness of Java class names among all complex types (both named and anonymous) [8].

5) Long Names (types, elements, attributes): Take the hash code of the entire name and truncate the name along with the hash code so that its length is at most the maximum size allowed for the name. In [11] the Java class name XML_N1640874745_LongNames_abcdefghijklmnopqrstu vwxyz_abcde" is generated for the complex type name. This will enable uniqueness of names (both of Java class names and member variable names) as one takes the hash code of the entire name. This also helps adhere to the maximum name size constraint. A similar approach is used in mapping schema element and attribute names to Java member variable names [11, 12].

Of course, one skilled in the art will appreciate how a variety of alternatives are possible for the individual elements, and their arrangement, described above, while still falling within the scope of the invention. Thus, while it is important to note that the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of signal bearing media include recordable-type media, such as a floppy disk, a hard disk drive, a RAM, CD-ROMs, DVD-ROMs. The signal bearing media may take the form of coded formats that are decoded for actual use in a particular data processing system. Moreover, while the depicted embodiment includes an example in a Java environment, the processes of the present invention may be applied to other programming languages and environments.

In conclusion, the above description has been presented for purposes of illustration and description of an embodiment of the invention, but is not intended to be exhaustive or limited to the form disclosed. This embodiment was chosen and described in order to explain the principles of the invention, show its practical application, and to enable those of ordinary skill in the art to understand how to make and use the invention. Many modifications and variations will be apparent to those of ordinary skill in the art. Thus, it should be understood that the invention is not limited to the embodiments described above, but should be interpreted within the full spirit and scope of the appended claims.

What is claimed is:

1. A method for mapping components of an XML schema using a program, comprising:
    a) receiving XML schema components;
    b) uniquely mapping the XML schema components to a conversion language; and
    c) receiving unique names for components of the conversion language based on names of the XML schema components; and
    wherein step c) further comprises at least one of the group consisting of: (1) hashing the name of each element having the same name and type as another element to form an element name hash code part of a Java member variable, (2) hashing the name of each attribute having the same name as another attribute to form an attribute name hash code part of a further Java member variable, (3) hashing a QName for each complex type to form a complex type name hash code part of a Java class name, (4) hashing each LongName name to form a LongName hash code part of a truncated Java name, and (5) hashing a concatenated string of all component names of an anonymous complex type component to form an anonymous complex type hash code part of a further Java class name.

2. The method of claim 1, wherein the conversion language is Java, and step b) further comprises steps of (1) mapping each XML schema element and type to a Java component and (2) uniquely identifying each XML schema element and type within a set of all distinct XML schema.

3. The method of claim 1, wherein the conversion language is Java, and step c) further comprises, for each different XML schema element and type, generating a unique Java component name.

4. The method of claim 3, wherein the step of generating each said unique Java component name comprises generating each name so that each said name substantially adheres to Java naming standards, and so that each said name remains the same in subsequent mappings of XML schema components when an XML schema component label on which said name is based remains the same.

5. The method of claim 1: wherein the conversion language is Java; step a. further comprises (1) mapping each XML schema element, type and attribute to a Java component and (2) uniquely identifying each XML schema element, type and attribute within a set of all distinct XML schema; and step b. further comprises, for each different XML schema element, type and attribute name, generating a unique Java component name; and the method further comprises generating a reusable definition object operable in converting information between an XML object associated with the XML schema and a Java object.

6. The method of claim 1, further comprising appending a suffix to a generated Java component name based on a first XML schema component name when the generated Java component name is identical to a previously generated Java component name based on a second XML schema component name different from the first XML schema component name.

7. An information handling system comprising a processor and an object definition tool for generating an object operable in mapping components of an XML schema, the object definition tool comprising plural instructions and the processor is operably configured to execute said plural instructions, the plural instructions comprising: a. mapping instructions operable for uniquely mapping XML schema components with a conversion language; and b. naming instructions operable for uniquely naming components of the conversion language based on names of the XML schema components;
    wherein the naming instructions further comprise hashing instructions configured to perform at least one of the group of operations consisting of: (1) hashing the name of each element having the same name and type as another element to form an element name hash code part of a Java member variable, (2) hashing the name of each attribute having the same name as another attribute to form an attribute name hash code part of a further Java member variable, (3) hashing a QName for each complex type to form a complex type name hash code part of a Java class name, (4) hashing each LongName name to form a LongName hash code part of a truncated Java name, and (5) hashing a concatenated string of all component names of an anonymous complex type component to form an anonymous complex type hash code part of a further Java class name.

8. The information handling system of claim 7, wherein the conversion language is Java, and the mapping instructions comprise instructions configured to (1) map each XML schema element and type to a Java component and (2) uniquely identify each XML schema element and type within a set of all distinct XML schema.

9. The information handling system of claim 7, wherein the conversion language is Java, and the naming instructions further comprise instructions, for each different XML schema element and type, configured to generate a unique Java component name.

10. The information handling system of claim 9, wherein naming instructions comprise yet further instructions configured to generate each name so that each said name substantially adheres to Java naming standards, and so that each said name remains the same in subsequent mappings of XML schema components when an XML schema component label on which said name is based remains the same.

11. The information handling system of claim 7 wherein the conversion language is Java; the mapping instructions comprise instructions configured to (1) map each XML schema element and type to a Java component and (2) uniquely identify each XML schema element and type within a set of all distinct XML schema; and the naming instructions further comprise additional instructions configured to generate, for each different XML schema element and type, a unique Java component name; the system further comprising object definition instructions configured to generate a reusable definition object operable in converting information between an XML object associated with the XML schema and a Java object.

12. The system of claim 11, further comprising appending instructions operable for appending a suffix to a generated Java component name based on a first XML schema component name when the generated Java component name is identical to a previously generated Java component name based on a second XML schema component name different from the first XML schema component name.

13. The system of claim 11, further comprising an adapter configured to operably convert XML objects using the reusable definition object to converted XML objects, and an application and computer operable together and configured to receive and perform operations on the converted XML objects.

14. A program product in a signal bearing medium executable by a device for generating an object operable in mapping components of an XML schema, the product comprising: a. mapping instructions operable for uniquely mapping XML schema components with a conversion language; and b. naming instructions operable for uniquely naming components of the conversion language based on names of the XML schema components;

wherein the naming instructions further comprise hashing instructions configured to perform at least one of the group of operations consisting of: (1) hashing the name of each element having the same name and type as another element to form an element name hash code part of a Java member variable, (2) hashing the name of each attribute having the same name as another attribute to form an attribute name hash code part of a further Java member variable, (3) hashing a QName for each complex type to form a complex type name hash code part of a Java class name, (4) hashing each LongName name to form a LongName hash code part of a truncated Java name, and (5) hashing a concatenated string of all component names of an anonymous complex type component to form an anonymous complex type hash code part of a further Java class name.

15. The program product of claim 14, wherein the conversion language is Java, and the mapping instructions comprise instructions configured to (1) map each XML schema element and type to a Java component and (2) uniquely identify each XML schema element and type within a set of all distinct XML schema.

16. The program product of claim 14, wherein the conversion language is Java, and the naming instructions further comprise instructions, for each different XML schema element and type, configured to generate a unique Java component name.

17. The program product of claim 16, wherein naming instructions comprise yet further instructions configured to generate each name so that each said name substantially adheres to Java naming standards, and so that each said name remains the same in subsequent mappings of XML schema components when an XML schema component label on which said name is based remains the same.

18. The program product of claim 14 wherein the conversion language is Java; the mapping instructions comprise instructions configured to (1) map each XML schema element and type to a Java component and (2) uniquely identify each XML schema element and type within a set of all distinct XML schema; and the naming instructions further comprise additional instructions configured to generate, for each different XML schema element and type, a unique Java component name; the product further comprising object definition instructions configured to generate a reusable definition object operable in converting information between an XML object associated with the XML schema and a Java object.

19. The program product of claim 18, further comprising appending instructions operable for appending a suffix to a generated Java component name based on a first XML schema component name when the generated Java component name is identical to a previously generated Java component name based on a second XML schema component name different from the first XML schema component name.

20. The program product of claim 19, further comprising adapter instructions configured to operably convert XML objects using the reusable definition object to converted XML objects.

* * * * *